Dec. 9, 1952   L. E. W. MONTROSE-OSTER   2,621,058
SUSPENSION SYSTEM FOR VEHICLES
Filed May 24, 1946   4 Sheets-Sheet 1
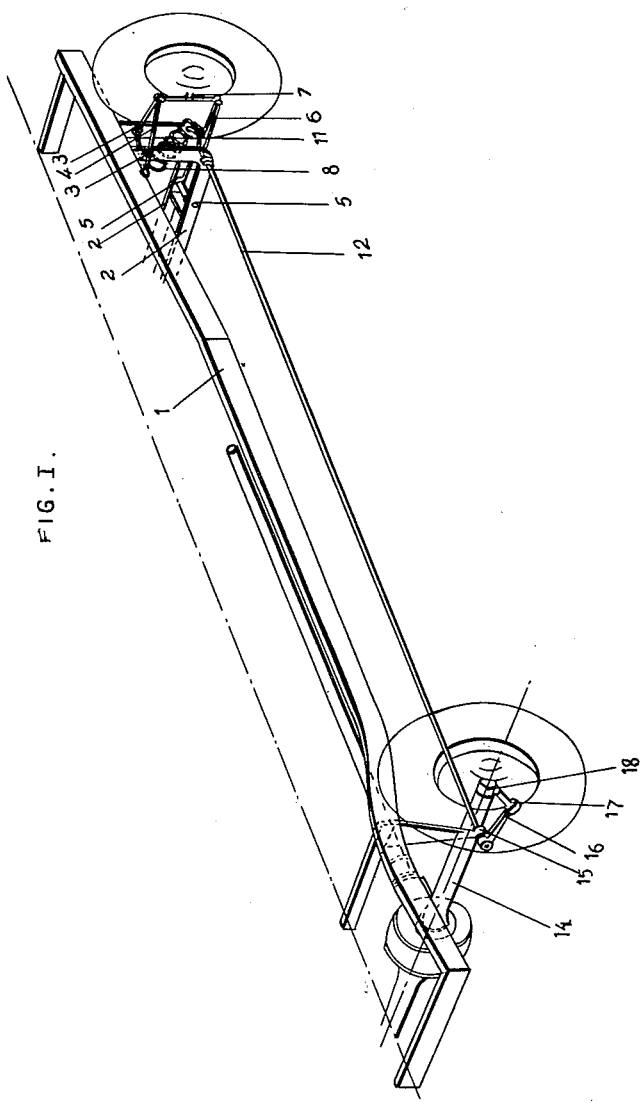
FIG. I.
*Inventor*
Louis Eugene Widolt Montrose-Oster
By Emery Holcombe & Blair
*Attorney*

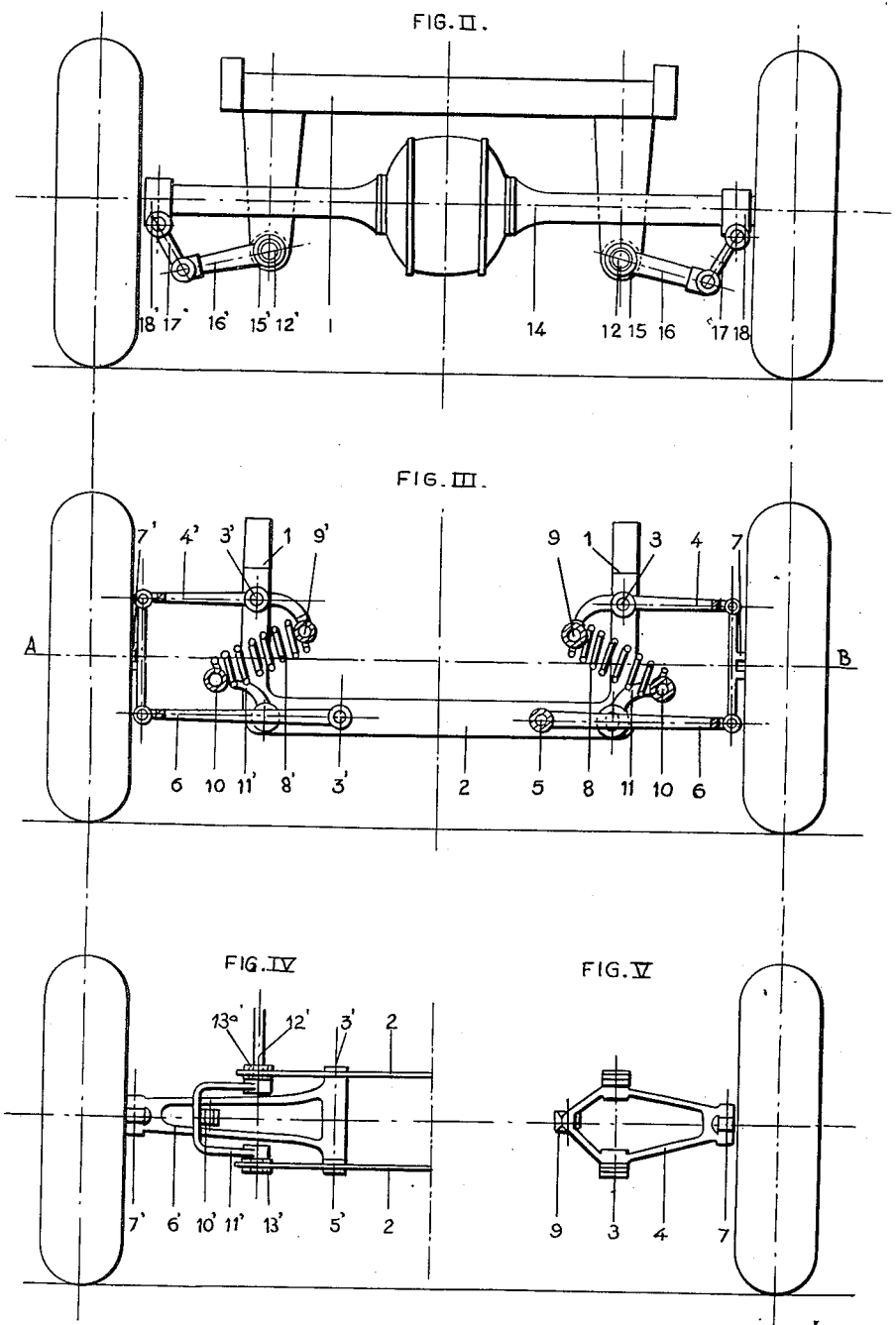

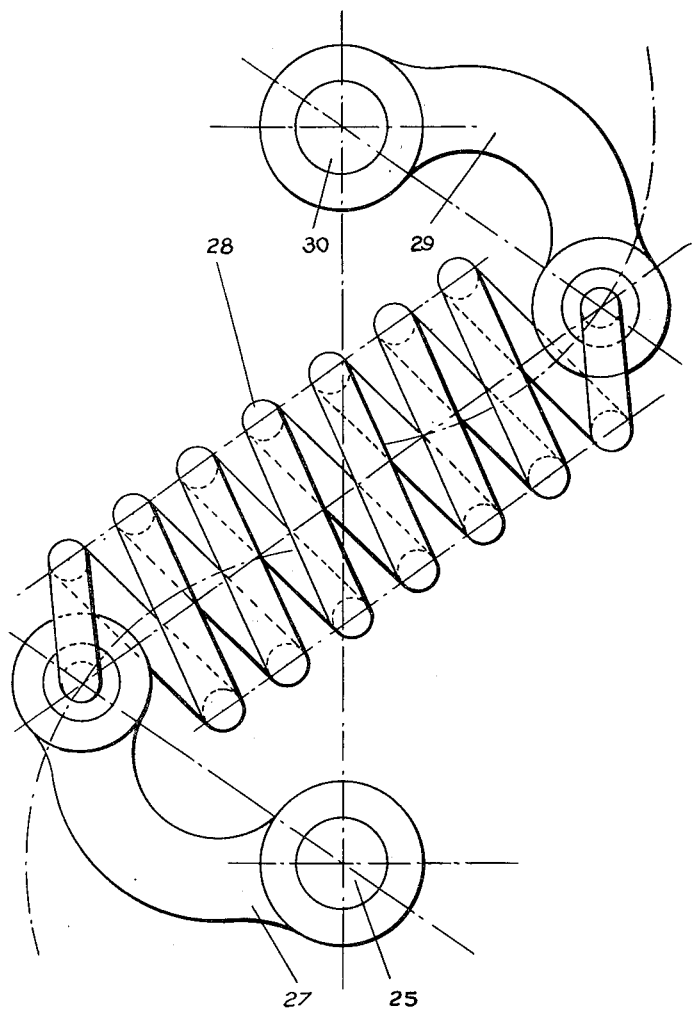

Dec. 9, 1952     L. E. W. MONTROSE-OSTER     2,621,058
SUSPENSION SYSTEM FOR VEHICLES
Filed May 24, 1946     4 Sheets-Sheet 4
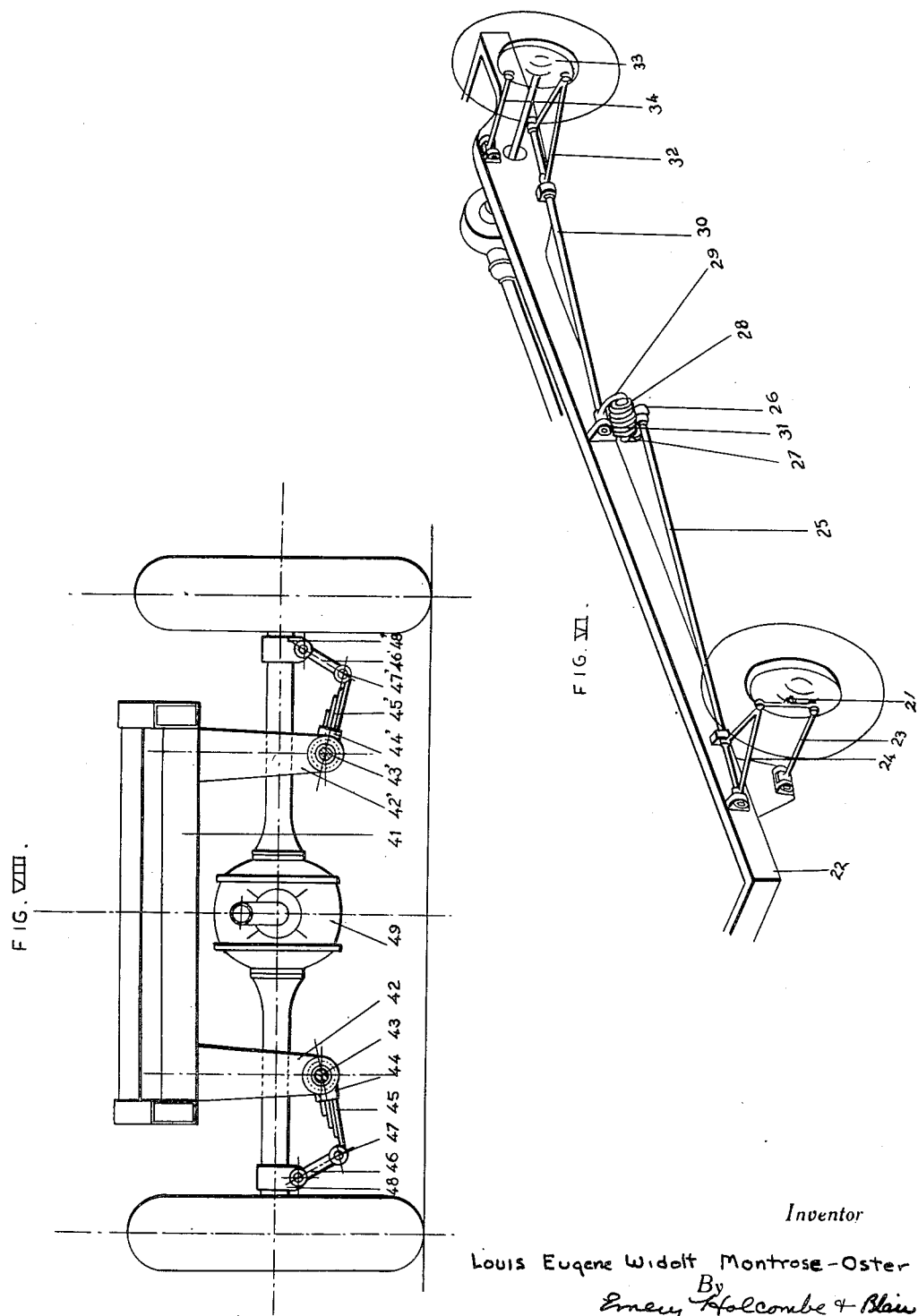
*Inventor*
Louis Eugene Widolt Montrose-Oster
By
Emery Holcombe & Blair
*Attorney*

Patented Dec. 9, 1952

2,621,058

UNITED STATES PATENT OFFICE 2,621,058

SUSPENSION SYSTEM FOR VEHICLES

Louis Eugène Widolt Montrose-Oster, Brussels, Belgium, assignor of one-half to Pollopas Patents Limited, London, England, a British company Application May 24, 1946, Serial No. 672,057
In France December 29, 1943

Section 1, Public Law 690, August 8, 1946
Patent expires December 29, 1963

11 Claims. (Cl. 280—104)

This invention relates to a self-stabilizing resilient conjugate suspension system for vehicles which move mainly in one direction and have four effective or virtual suspension points, namely, two arranged one behind the other at each side of the vehicle. Suspension systems of this character are disclosed in my copending applications Serial Number 672,055, filed May 24, 1946, now Patent No. 2,563,261, dated August 7, 1951, and Serial Number 672,056, filed May 24, 1946, in which two lateral conjugate suspensions are provided, one at each side of the vehicle for the two wheels or virtual suspension points at that side, and in each of these suspensions one and the same member acts at the same time both as an interconnecting or conjugating member and as a resilient member of the suspension, such dual-purpose member preferably being in the form of a torsion bar.

It has been found in cases where it is desired to impart very great flexibility to the suspension, that unless the vehicle is abnormally light and has an abnormally long wheelbase, a torsion bar conjugate suspension may be insufficient to provide the flexibility required, even when the bar is nearly the same length as the vehicle wheelbase. In order to overcome this difficulty and meet requirements for greater flexibility, the flexibility of the suspension is increased, in accordance with the present invention, by coupling one or more supplementary resilient elements in series with the torsion bar. According to a feature of this invention, such a supplementary element is, however, not merely added to the suspension to constitute a mere adjunct thereto, but is substituted for a rigid element already embodied in the suspension. In this way, the number of parts comprising the suspension is not increased, and any increase in weight of the suspension that may result from this substitution is negligible.

The present invention may be carried into effect in various ways, varying with the particular constructional form of the conjugate suspension system to which it is applied. Thus, for instance, where there were small front or rear connecting rods linking the torsion bar to the front or rear wheel carriers, one or more of such rigid rods may be replaced by a coil spring; or in the case of a lever rigid with the torsion bar, it may be replaced by a leaf spring.

In order that the invention may be more clearly understood, the accompanying drawings diagrammatically illustrate, by way of example, three embodiments of conjugate suspension according to the invention applied to automobile vehicle chassis, these embodiments in particular illustrating the manner of modifying, in accordance with the present invention, certain of the embodiments illustrated in my copending application Serial No. 672,056 aforesaid.

In the drawings:

Fig. 1 is a fragmentary perspective view of one half of a chassis having independently-mounted front wheels and a rear axle provided with a conjugate suspension system of two lateral conjugate suspensions each of which has a single torsion bar conjugating the suspension of the two wheels at the same side of the chassis. Fig. 2 depicts the rear portion of the chassis looking in the running direction. Fig. 3 shows, on a vertical plane through the spindles of the front wheels, a section of the front looking against the running direction, and Figs. 4 and 5 show, on a horizontal plane through the spindles of the front wheels, the lower and upper parts of the front arrangement respectively, the helical springs being removed.

Fig. 6 is a fragmentary perspective view of one half of a chassis having another form of the suspension system in which each of the two lateral conjugate suspensions comprises two torsion bars and a supplementary central spring provided in accordance with the present invention, all these resilient elements being mounted in series.

Fig. 7 shows on a larger scale the central device which is employed in this embodiment to produce the stabilizing couples, and is at the same time resilient.

Fig. 8 shows the rear of a chassis and illustrates another embodiment in which a supplementary resilient element is interposed, in accordance with this invention, between each rear wheel and the corresponding torsion bar.

In the drawings, the parts of the suspension are depicted in heavy lines, all other parts being indicated in light lines. Also, for clarity and simplification in Figs. 1, 2 and 8, the various axle guide members which form no part of the present invention are not shown.

Figs. 1 to 5 illustrate a modification, in accordance with the present invention, of the form of suspension illustrated in Figs. 1 to 4 of my copending application Serial No. 672,056 aforesaid. The double cross member 2—2 of the chassis I in Figs. 1 to 5 supports the joints 3 and 5 of the double triangular upper lever 4 and the lower lever 6 respectively. The spindle carrier 7 of the front wheel is linked to the two levers 4 and 6. A helical spring 8 links the upper lever 4 and a lever 11 keyed on the torsion bar 12, the spring 8 being connected at its ends to the levers 4 and 11 by suitable elements such as silent-block bushings 9 and 10. The lever 11 is pivoted to the cross member 2—2 by means of suitable bearings (similar to bearings 13' and 13a' shown in Fig. 4 for the corresponding lever 11' at the other side of the chassis) allowing an easy connection between the lever 11 and the torsion bar 12. The latter is guided, in the neighbourhood of the rear axle 14, by a bearing 15 integral with the chassis 1. A lever 16 keyed on the extremity of the torsion bar 12 is connected to the rear axle 14 through a link 17 attached to the collar 18 fast on the rear axle 14.

As Figs. 2 to 5 indicate, the two sides of the chassis are provided with similar members, those at one side being designated by the same reference numerals as those at the other side, but distinguished by indexes.

It will be observed by comparison with Figs. 1 to 4 and relevant description in my copending application Serial No. 672,056 aforesaid that the small connecting rod or link 8 in that embodiment has been replaced by the spring 8 in the present embodiment. Otherwise than consequential upon this substitution, the construction is substantially unchanged. Just as is the case in the original embodiment, stability about the transverse axis is obtained solely by a restoring or stabilizing couple produced as a function of the inclination of the chassis about that axis, and consequently no additional restoring or stabilizing device need be provided.

In such a case as exemplified by Figs. 5 to 8 of my copending application Serial No. 672,056 aforesaid, where the torsion bar is made integral with the lever support for a front wheel, rear wheel, or both, and the device producing the stabilizing couple is arranged at a central point near the middle of the bar which consequently is divided into or replaced by two bars, the substitute spring provided by the present invention may conveniently take the place of the rigid central small connecting rod or link 28 of the corresponding original embodiment described in my copending application Serial No. 672,056 aforesaid.

Figs. 6 and 7 illustrate this modification. Similarly as in the original embodiment, the spindle carrier of each front independently-mounted wheels 21 is linked to the chassis 22 by means of a lower simple lever 23 and a triangular upper lever 24. A torsion bar 25 rigid with the lever 24 or with its spindle extends approximately to half way between the front and rear wheels, where it is guided by a bearing 26 integral with the chassis 22. In accordance with the present invention, a helical spring 28 movable in space is substituted for the rigid link 28 in the original embodiment, to link the corresponding lever 27 keyed to the bar 25, with the similar lever 29 rigid with the torsion bar 30 which is guided at its front part by the bearing 31, and at its rear end is rigid with the triangular lower lever 32 (or its spindle) of the spindle carrier of the rear wheel 33. The latter spindle carrier is also linked to the chassis by means of a simple upper lever 34 as in the original embodiment. The enlarged view of the central device given in Fig. 7 clearly shows the way in which the stabilizing couple is produced.

Whilst in the above-described embodiments there would be every advantage in replacing a rigid element subjected to compression or to traction by a helical spring, the simplest solution in the case of an element subjected to flexion would be to replace it by a leaf spring. As an example of this application, Fig. 8 shows a modification of the suspension of the rear axle shown in Figs. 1 and 2, in which the rigid levers (viz. 16, 16') integral with the torsion bars (12, 12') are replaced by corresponding but resilient elements, namely, leaf springs.

In the parts 42, 42' of the chassis 41 in Fig. 8 are arranged the bearings of the torsion bars 43, 43'. Leaf springs 45, 45' are fixed to the ends of the bars 43, 43' by means of shackles 44, 44'. Small connecting rods 46, 46' link the ends 47, 47' of the leaf springs 45, 45' to the collars 48, 48' on the rear axle 49.

The described embodiments make it possible to increase the flexibility of the conjugate suspension as compared with the corresponding embodiments described in my copending application Serial No. 672,056 aforesaid, by putting in series with the torsion bars supplementary resilient elements which simply take the place of previously rigid elements, the result being a maximum effect with a minimum dead weight.

Theoretically, the total flexibility of the conjugate suspension system can be distributed at will over the various resilient elements mounted in series, but since the behaviour of the characteristics of the action of the wheels on the suspension and of the reaction thereto of the resilient suspension is influenced thereby, the possibilities of such distribution are limited in practice.

Although some particular embodiments of the invention have been described, those are merely illustrative and not limitative since the invention is susceptible of numerous constructional variations. As applied to automobile vehicles, the invention may be utilized equally well for front-wheel drive vehicles as for rear-wheel drive vehicles.

I claim:

1. In a vehicle adapted to move mainly in one running direction and comprising a chassis supported on wheels at four supporting points, two at each longitudinal side of the chassis, disposed one near the front end and the other near the rear end of the chassis, a resilient conjugate suspension system comprising two self-stabilizing resilient conjugate suspensions, arranged one at each longitudinal side of the chassis, each of said two conjugate suspensions being independent of the other, and each including two levers fulcrumed to the chassis respectively at the front end and rear end supporting points at the same side of the chassis and extending in the same direction laterally thereof, a plurality of wheel-supporting means each supporting a wheel, means connecting the free extremities of said levers respectively to the adjacent wheel-supporting means, the angle between each such connecting means and the lever to which it is connected being other than a right angle, means including torsion spring means extending longitudinally of the chassis and resiliently and mechanically interconnecting said levers in such manner that vertical displacements in like sense of the front and rear wheels relative to the chassis apply opposed torsional leverage to said torsion spring means tending to move said levers in opposite directions whereby said angle at one displaced end tends to depart further from a right-angle under increasing static load upon said end.

2. In a vehicle adapted to move mainly in one running direction and comprising a chassis supported on wheels at four supporting points, two at each longitudinal side of the chassis disposed one near the front end and the other near the rear end of the chassis, a resilient conjugate suspension system comprising two self-stabilizing resilient conjugate suspensions arranged one at each longitudinal side of the chassis, each of said two conjugate suspensions being independent of the other, and each including two levers fulcrumed to the chassis respectively at the front end and rear end supporting points at the same side of the chassis and extending in the same direction laterally thereof, a plurality of wheel-supporting means each supporting a wheel, means connecting the free extremities of said levers respectively to the adjacent wheel-supporting means, the angle between each such connecting means and the lever to which it is connected being other than a right angle, means including torsion spring means extending longitudinally of the chassis and resiliently and mechanically interconnecting said levers in such manner that vertical displacements in like sense of the front and rear wheels relative to the chassis apply opposed torsional leverage to said torsion spring means tending to deflect said levers in opposite directions whereby said angle at one displaced end tends to depart further from a right-angle under increasing static load upon said end, the means connecting the free extremities of said levers at one end of the chassis to said adjacent wheel-supporting means each comprising a spring member.

3. An arrangement as claimed in claim 2 in which the levers fulcrumed to said supporting points at the opposite end of the chassis from said spring linked end comprise spring members.

4. In a vehicle adapted to move mainly in one running direction and comprising a chassis supported on wheels at four supporting points, two at each longitudinal side of the chassis disposed one at the front end and the other at the rear end of the chassis, a resilient conjugate suspension system comprising two self-stabilizing resilient conjugate suspensions arranged one at each longitudinal side of the chassis, each of said two conjugate suspensions being independent of the other, and each including two levers respectively fulcrumed at the front and rear supporting points at the same side of the chassis, means including torsion spring means extending longitudinally of the chassis and resiliently and mechanically interconnecting said levers, one of said levers being directed downwardly and outwardly from its fulcrum point and the other of said levers being directed upwardly and outwardly from its fulcrum point, a link member extending upwardly and outwardly from the free extremity of said downwardly-directed lever at an obtuse angle thereto and connecting said extremity of said last-mentioned lever to adjacent wheel-supporting means, and a link member extending upwardly and inwardly from said upwardly-directed lever at an acute angle thereto and connecting said last-mentioned lever to adjacent wheel-supporting means, at least one of said levers and links comprising a spring member, the arrangement being such that the said obtuse angle between the appropriate link and its connected lever becomes more obtuse and the said acute angle between the appropriate link and its connected lever becomes more acute under increasing static load.

5. In a vehicle adapted to move mainly in one running direction, the combination of a chassis supported on wheels at four supporting points, two at each longitudinal side of the chassis disposed one at the front end and the other at the rear end of the chassis, torsion bars rotatably carried by said chassis and extending longitudinally thereof between the two supporting points at each side of said chassis, levers fast on the four ends of said bars, two of said levers at one end of the chassis being directed outwardly and downwardly from their associated bar, and the other two of said levers at the other end of said bars being directed outwardly and upwardly of said bar, a link extending upwardly and outwardly from the free extremities of each of said downwardly-directed levers and at an obtuse angle thereto, and a link extending upwardly and inwardly from the free extremities of each of said upwardly-directed levers and at an acute angle thereto, said links connecting the extremities of said levers to the adjacent wheel support means, at least one of said levers and links comprising a spring member and the arrangement being such that said obtuse angles become more obtuse and said acute angles become more acute under increasing static load thereby producing an unbalanced couple of forces tending to restore said chassis to normal equilibrium.

6. In a vehicle adapted to move mainly in one running direction, the combination of a chassis supported on wheels at four supporting points, two at each longitudinal side of the chassis disposed one at the front end and the other at the rear end of the chassis, torsion bars rotatably carried by said chassis and extending longitudinally thereof between the two supporting points at each side of said chassis, levers fast on the four ends of said torsion bars arranged in pairs extending in opposite directions laterally at opposite sides of said chassis, the levers on the ends of the same bar each extending in the same direction laterally, a plurality of wheel-supporting means each supporting a wheel, links connecting the free extremities of said levers respectively to the adjacent wheel-supporting means in such manner that vertical displacements in like sense of the front and rear wheels relative to the chassis apply opposed torsional leverage to the associated torsion bar, the angle between each link and its connected lever being other than a right-angle, and each of said links connecting the free extremities of said front levers to said adjacent wheel-supporting means comprising a spring member, the arrangement being such that said angle at one displaced end tends to depart further from a right-angle under increasing static load at said end.

7. An arrangement as claimed in claim 6, in which each of said levers fulcrumed to said rear supporting points comprises a spring member.

8. In a vehicle adapted to move mainly in one running direction and comprising a chassis supported on wheels at four supporting points, two at each longitudinal side of the chassis disposed one at the front end and the other at the rear end of the chassis, a self-stabilizing resilient conjugate suspension system comprising two resilient conjugate suspensions arranged one at each longitudinal side of the chassis, each of said two conjugate suspensions being independent of the other, and each including two levers respectively fulcrumed at the front and rear supporting points at the same side of the chassis, means including torsion spring means extending longitudinally of the chassis and resiliently and mechanically interconnecting said levers, one of said levers being directed downwardly and outwardly from its fulcrum point and the other of said levers being directed upwardly and outwardly from its fulcrum point, a link member extending upwardly and outwardly from the free extremity of said downwardly-directed lever at an obtuse angle thereto and connecting said extremity of said last-mentioned lever to adjacent wheel-supporting means, and a link member extending upwardly and inwardly from said upwardly-directed lever at an acute angle thereto and connecting said last-mentioned lever to adjacent wheel-supporting means, the arrangement being such that the said obtuse angle between the appropriate link and its connected lever becomes more obtuse and the said acute angle between the appropriate link and its connected lever becomes more acute under increasing static load.

9. In a vehicle adapted to move mainly in one running direction, the combination of a chassis supported on wheels at four supporting points, two at each longitudinal side of the chassis disposed one at the front end and the other at the rear end of the chassis, torsion bars rotatably carried by said chassis and extending longitudinally thereof between the two supporting points at each side of said chassis, levers fast on the four ends of said bars, two of said levers at one end of the chassis being directed outwardly and downwardly from their associated bars, and the other two of said levers at the other end of said chassis being directed outwardly and upwardly of said bars, a link extending upwardly and outwardly from the free extremity of each of said downwardly-directed levers and at an obtuse angle thereto, and a link extending upwardly and inwardly from the free extremity of each of said upwardly-directed levers and at an acute angle thereto, said links connecting the extremities of said levers to the adjacent wheel support means, the arrangement being such that said obtuse angles become more obtuse and said acute angles become more acute under increasing static load, thereby producing an unbalanced couple of forces tending to restore said chassis to normal equilibrium.

10. In a vehicle adapted to move mainly in one running direction, the combination of a chassis supported on wheels at four supporting points, two at each longitudinal side of the chassis disposed one near the front end and the other near the rear end of the chassis, torsion bars rotatably carried by said chassis and extending in pairs longitudinally thereof between the two supporting points at each side of said chassis, rigid levers fast on the adjacent ends of each said pair of bars and extending laterally in opposite directions, there being one such a pair on the adjacent ends of each pair of torsion bars, means connecting the free extremities of said rigid levers, a plurality of wheel-supporting means each supporting a wheel, levers fast on the front and rear ends of said torsion bars, and means pivotally connecting the free extremities of said last named levers respectively to the adjacent wheel-supporting means whereby vertical displacements in like sense of the front and rear wheels relative to the chassis apply opposed torsional leverage to the associated torsion bars, the angle between each of at least one pair of connecting means and its connected lever being other than a right-angle and the arrangement being such that said angle at a displaced end tends to depart further from a right-angle under increasing static load upon said end.

11. In a vehicle as described in claim 10, flexible means comprising spring members connecting the free extremities of the levers of each middle pair of levers.

LOUIS EUGÈNE WIDOLT
MONTROSE-OSTER.

REFERENCES CITED

The following references are of record in the file of this patent:

UNITED STATES PATENTS

| Number | Name | Date |
|---|---|---|
| 1,396,549 | Beatty | Nov. 8, 1921 |
| 2,099,819 | Mercier | Nov. 23, 1937 |
| 2,168,630 | Schiff | Aug. 8, 1939 |
| 2,333,008 | Holmstrom et al. | Oct. 26, 1943 |
| 2,416,388 | Hendrix | Feb. 25, 1947 |